United States Patent [19]
Morton

[11] 3,916,531
[45] Nov. 4, 1975

[54] LEVELING METHOD AND DEVICE FOR MOTOR HOME

[76] Inventor: Paul S. Morton, 82 Mandalay Drive, Oshtemo Twp., Mich. 49009

[22] Filed: Jan. 2, 1974

[21] Appl. No.: 429,941

[52] U.S. Cl. ...................... 33/333; 33/370; 33/390; 248/242; 248/248
[51] Int. Cl.² ............................................ G01C 9/36
[58] Field of Search ............ 33/333, 335, 384, 385, 33/386, 370, 371, 390, 383; 248/242, 246, 247, 248

[56] References Cited
UNITED STATES PATENTS

| | | | |
|---|---|---|---|
| 2,620,572 | 12/1952 | Massey | 33/370 |
| 2,806,296 | 9/1957 | Weichert | 33/334 |
| 3,422,544 | 1/1969 | Wyse | 33/333 |
| 3,664,032 | 5/1972 | Tompkins | 33/390 |

*Primary Examiner*—Richard E. Aegerter
*Assistant Examiner*—Steven L. Stephan
*Attorney, Agent, or Firm*—Woodhams, Blanchard & Flynn

[57] ABSTRACT

There is provided a horizontal 360° sensitive spirit level mounted adjacent the driver's location in a motor home which is adjusted into a predetermined relationship with a generally similar level indicator at a selected location elsewhere in the motor home, such as on a refrigerator therein. Thereafter, the motor home can be leveled with respect to said spirit level readable from the driver's location and when so leveled it will be known that the selected location will also be level.

4 Claims, 5 Drawing Figures

U.S. Patent  Nov. 4, 1975  3,916,531
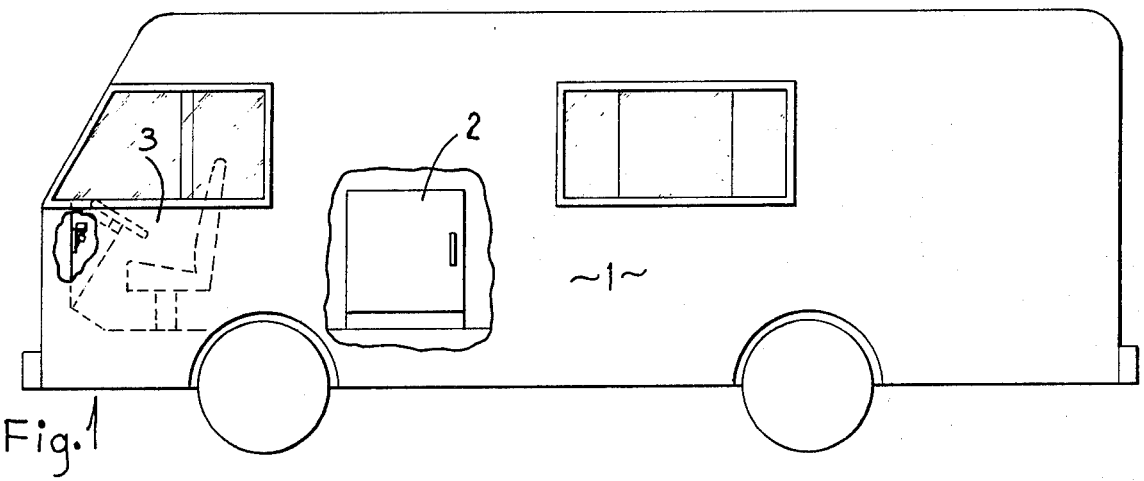
Fig. 1
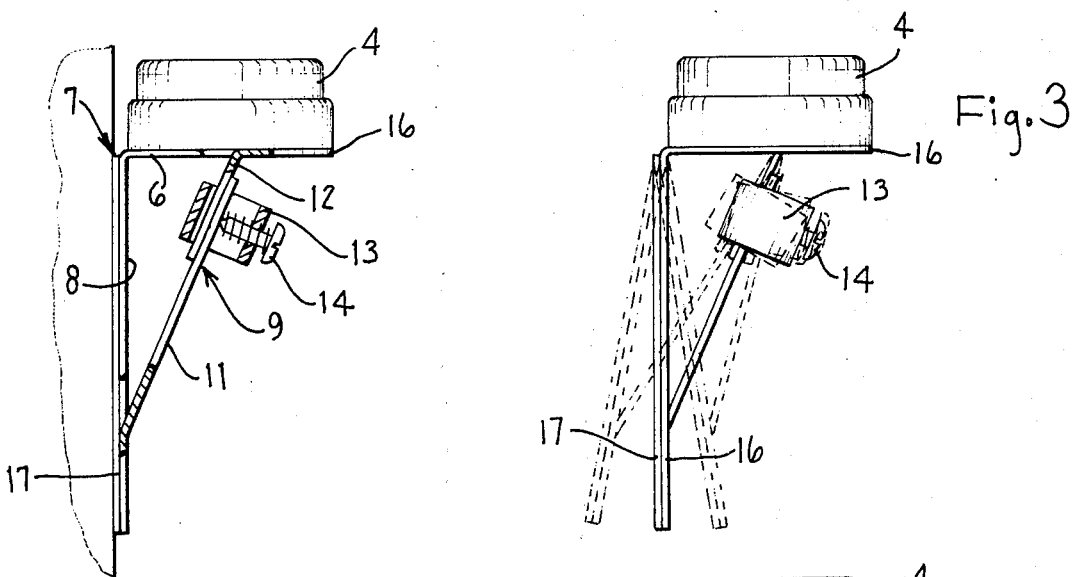
Fig. 2
Fig. 3
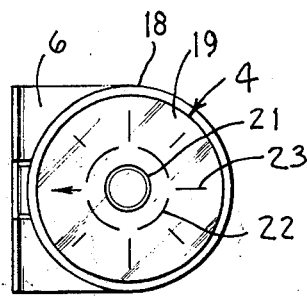
Fig. 4
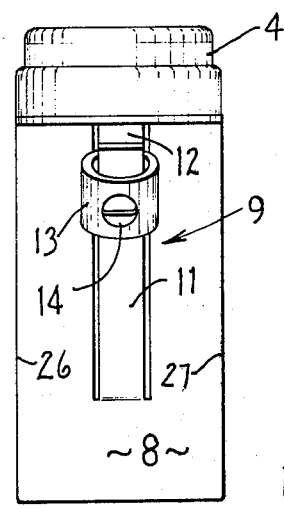
Fig. 5

3,916,531

LEVELING METHOD AND DEVICE FOR MOTOR HOME

FIELD OF THE INVENTION

This invention relates to attitude indicating devices and particularly to means for indicating proper orientation with respect to the horizontal of an item of equipment within a road vehicle, such as a refrigerator unit with a motor home.

BACKGROUND OF THE INVENTION

In the handling of road vehicles with living facilities therein, such as motor homes or campers, there has long been a problem in the parking thereof which it has been essential to deal with properly but is often awkward or inconvenient. Reference is made to the fact that such vehicles often contain therein equipment, such as a refrigerator, which for proper operation must be maintained in a predetermined orientation with respect to the horizontal and hence it is essential that the vehicle either be parked on level ground or that appropriate accommodation be made between the body and frame of the vehicle so that when parked at least the body thereof (or at least the item of equipment in question) be maintained at the proper orientation.

Inasmuch as the problem has usually arisen with respect to refrigerators in a motor home, further discussion thereof will be in terms of such equipment and in such a vehicle, even though it will be recognized that in the broader aspects of the invention other types of equipment might be involved as well as other types of vehicles.

In bringing the motor home into a parking condition, it is essential for the proper operation of the refrigerator that same be oriented within a few degrees of a predetermined position with respect to the horizontal. Where the parking area is itself horizontal, as the majority thereof are at least intended to be, this often presents little or no problem. However, many are otherwise and hence it is often necessary either to move the motor home into a variety of positions on the parking pad until proper orientation is achieved or where the motor home is so equipped it is necessary to adjust whatever devices are provided for altering the position of the motor home body with respect to the chassis for achieving this purpose. Where either is done, the point of reference is the refrigerator and the level indicator thereon and such refrigerator is normally so positioned that it or at least its level indicator cannot be read from the driver's position. It is thus either necessary that another person be available to provide constant information to the driver concerning the reading of said level indicator, which may not always be entirely satisfactory, or that the driver frequently leave his position and himself inspect the said level indicator, which is usually even less satisfactory.

To remedy this situation, it has been suggested that a remote reading device be provided for such refrigerator whereby the sensing portion thereof is on the refrigerator and the reading portion thereof is at the driver's location. However, this is relatively expensive and is usually considered to be too expensive to be justifiable under all the circumstances.

Accordingly, the objects of the invention include:

1. To provide means by which the orientation with respect to the horizontal of a motor home, camper or the like, and particularly the orientation of a selected item of equipment carried within said vehicle, may be accurately read from the driver's position therein.

2. To provide apparatus, as aforesaid, which will be extremely inexpensive to manufacture and sell and which can hence be added to such vehicle equipment either as original or as after-market equipment at a minimum of cost.

3. To provide apparatus, as aforesaid, which can, if desired, be added by the owner of a vehicle without the necessity of using special tools or possessing special skill.

4. To provide apparatus, as aforesaid, which will be reliable within the order of accuracy required for proper maintenance of the equipment whose orientation is being controlled, usually a refrigerator within a motor home, camper or similar vehicle.

5. To provide apparatus, as aforesaid, which will be extremely simple in operation and hence virtually error free.

6. To provide apparatus, as aforesaid, which will be of sufficient simplicity that anyone with sufficient technical ability to operate a road vehicle will be able to accurately read and understand the reading of such instrument and use it correctly to obtain the proper orientation of the vehicle.

Other objects and purposes of the invention will be apparent to persons acquainted with apparatus of this general type upon reading the following disclosure and inspection of the accompanying drawings.

IN THE DRAWINGS

FIG. 1 represents a somewhat schematic, partially broken, partially phantomized side elevational view of a motor home illustrating the use of the invention.

FIG. 2 is a side, partially sectioned, view of a device embodying the invention.

FIG. 3 is a side, elevational view of such device and showing in phantom alternate adjustments thereof.

FIG. 4 is a top view of a device embodying the invention.

FIG. 5 is an end view of the device embodying the invention taken from the right of either FIG. 2 or FIG. 3.

SUMMARY OF THE INVENTION

In carrying out the invention there is provided a circular spirit level device (that is, a spirit level device sensitive in all 360° of direction), and a bracket for mounting same by which may be adjusted with respect to a vertical mounting strip and then firmly held in a selected adjustable position. Said device is mounted at a point adjacent the driver's position where it can be read, normally on the instrument panel. With the vehicle so parked and/or otherwise adjusted that the refrigerator is in a properly horizontal position as indicated by its own level indicator, the device of the invention is adjusted as necessary so that its bubble indicates horizontal alignment thereof. Thereafter, the vehicle needs to be aligned only with the indicator adjacent the driver and when so aligned it will be known that the refrigerator is also in proper position.

DETAILED DESCRIPTION

Referring to the drawings, there is shown in FIG. 1 a schematically indicated motor home having a body 1 carrying a refrigerator 2 and provided with a driver's location 3. It is assumed, which is usually the case, that the refrigerator 2 as purchased is provided with a level indicating device which may be read from some point adjacent the refrigerator. The device of the invention is indicated in FIG. 2 and includes a spirit level unit 4 mounted on the horizontal leg 6 of a bracket 7 whose vertical leg 8 comprises mounting means for fixing said instrument to a vertical surface (screw holes, pressure sensitive adhesive, or other). A lengthwise adjustable brace 9 is provided for adjusting the angular relationship between the horizontal leg 6 and the vertical leg 8. In this embodiment the brace 9 comprises a lower component 11 and an upper component 12 which lie together adjacent their respective ends and are held in fixed relationship to each other by a clamp 13 of any convenient type. In this embodiment the upper and lower components 11 and 12 are struck out of appropriate portions of the horizontal and vertical legs 6 and 8, respectively, and the clamp 13 comprises a ring with a metal screw 14 threaded thereinto and engaging said upper and lower components 12 and 11 as shown for effecting clamping therebetween or permitting relative movement therebetween as is desired merely by tightening or loosening of said screw. In this embodiment the bracket is made from a single sheet of any suitable material, such as sheet aluminum, indicated at 16 with the components comprising the brace 9 being struck out therefrom. A layer of pressure sensitive adhesive is shown at 17 for mounting the device as desired.

The spirit indicator 4 is of conventional construction for 360° operation. Particularly, same comprises a circular container 18 having a flat, transparent top 19. The container is filled with a suitable liquid defining a bubble 21. A circular marking 22 is provided on the cover 19 and if desired further indicia one of which is indicated at 23 may be arranged around the circle 22 for ease in reading the position of the bubble 21.

In use the device is affixed to any convenient surface adjacent the driver's position such as on the instrument panel conveniently in front of him. The vehicle is parked in such a manner that the level indicator on the refrigerator 2 indicates that same is properly oriented with respect to the horizontal. The leveling device is then mounted in vertical alignment with respect to the vehicle body insofar as the edges 26 and 27 of the bracket portion thereof are concerned and with the screw 14 properly loosened the brace 9 is adjusted so that the bubble 21 is centered within the circle 22. The device carrying said bubble 21 is now in a fixed relationship with the level indicator of the refrigerator and an indication by the bubble 21 will indicate the position of the refrigerator.

Now if the vehicle after a period of traveling is brought to a parking location, it is necessary only for the driver to park same in such a manner that the bubble 21 indicates correct orientation and he will know that the level indicator of the refrigerator is also indicating proper position for the refrigerator. Such adjustment may, of course, be accomplished in any manner provided by the vehicle either by moving the vehicle around the parking pad to find an appropriate spot thereon, by adjusting the position of the vehicle body with respect to its chassis if same is provided with means for such purpose, or other adjusting procedures as appropriate.

The size of the circle 22 may be selected with respect to the size of the bubble 21 to indicate the degree of error from the exact positioning which may be permitted. For example, in one embodiment of the invention the positioning of the refrigerator is acceptable if the bubble is anywhere within the circle 22 even though not in the exact center thereof.

In the foregoing discussion it has been assumed that the equipment 2, usually a refrigerator, is provided with its own level indicator and such will be the normal case. However, if as occasionally happens a refrigerator or other item of equipment is used in a given vehicle which is not provided with its own level indicator, then another unit as above described may be attached to the refrigerator, adjusted to indicate a level position when the refrigerator is properly oriented and then used in the same manner as above indicated for the level indicator of the refrigerator.

While the foregoing deals with a recreational vehicle having a body fixed, or adjustably fixed, with respect to the vehicle chassis, particularly campers or motor homes, it is evident that the broader aspects of the invention and particularly the instrument described can also be applied to a mobile home or other trailer-type vehicle. This latter will be accomplished by placing the instrument at a point on the mobile home at which it can be seen by a person effecting either longitudinal or lateral adjustment of the trailer for parking purposes and referencing it in the same manner as above described with respect to a desired location with the vehicle such as the refrigerator. For such use the instrument may be built in substantially the same manner, and with the same adjustability, as above described but where such use on a mobile home requires the instrument to be mounted on the exterior thereof it will need to be built in a sufficiently rugged manner to withstand weather, possible flying gravel and other tendencies for damage or deterioration which such exterior mounting would create.

While a specific embodiment of the invention has been chosen to illustrate same, it will be recognized that numerous modifications are possible within the broad concept thereof and accordingly the claims hereinafter appended will be so interpreted unless specifically limited otherwise by their express terms.

The embodiments of the invention in which an exclusive property or privilege is claimed are defined as follows:

1. In a device for reading the orientation of a vehicle body to ensure the proper orientation of an item of equipment carried thereby, the combination comprising:

a container for holding a bubble supporting liquid and being of circular section through a first plane;

a transparent cover having at least its perimeter generally parallel with said plane and closing said container;

liquid within said container defining a bubble adjacent said cover;

a bracket comprising a single sheet of material bent to form a generally L-shape for mounting said container against a surface defining a second plane generally perpendicular to said first plane, said container being mounted on one of the legs of said bracket;

a brace struck out from said single sheet so that said brace and said L-shaped bracket are composed of said single sheet, said brace being integrally attached at one end to one leg of said bracket and being integrally attached at the other end to the other leg of said bracket, said brace comprising a pair of segments, one being slidable along the other; and adjusting means intermediate the ends of said brace for adjusting the effective length of said brace and the precise angle between the legs of said L-shaped bracket, said adjusting means comprising a clamp which when loose permits such sliding and when tight fixes said segments with respect to each other to hold said brace firmly in an adjusted position whereby to hold said bracket with the one leg thereof and the other leg in precisely adjusted angular relationship with respect to each other.

2. The combination according to claim 1, wherein said one leg of said bracket extends generally parallel with said first plane and is fixed to the bottom of said container and the other leg of said bracket extends generally perpendicular to said one leg, said other leg of said bracket including means for securing said other leg to a vertical surface in said vehicle.

3. The combination according to claim 1, including indicia on said cover comprising a circle concentric with the position of said bubble when said first plane is in an exactly horizontal position.

4. The combination according to claim 1, wherein said single sheet and said brace have a uniform thickness.

* * * * *